INVENTOR
WALLACE H. SAMUELSON

BY *LeBlanc & Shur*
ATTORNEY

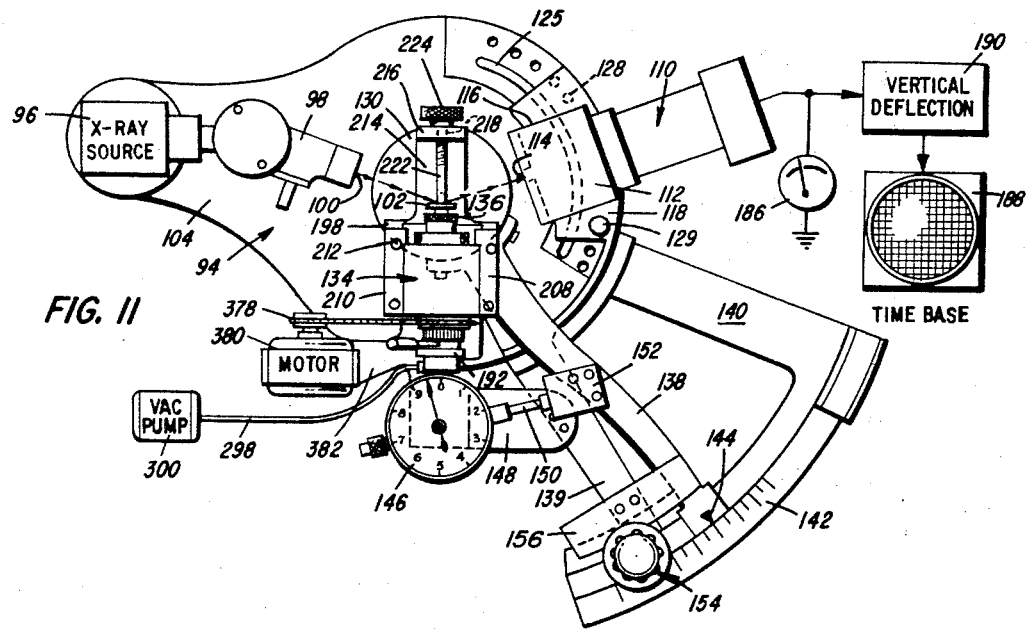

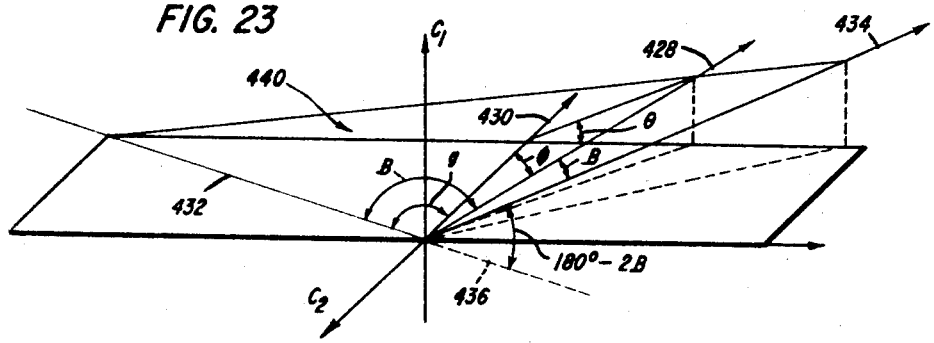
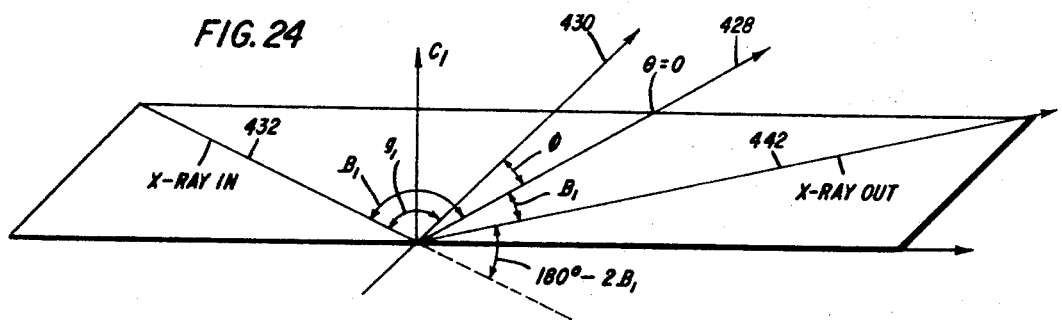
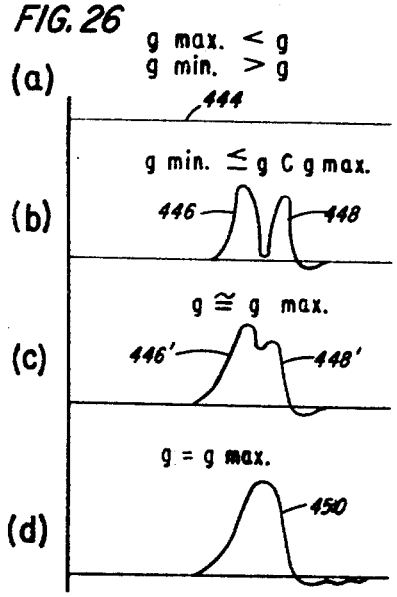
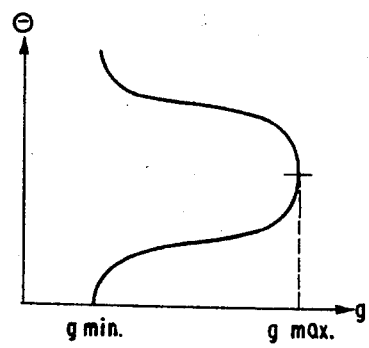
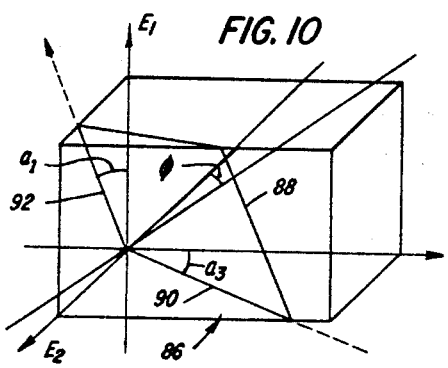

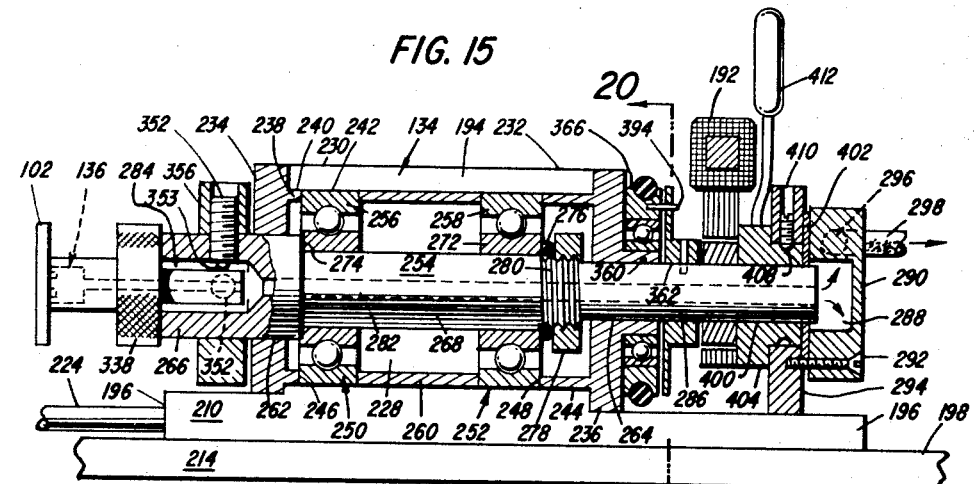
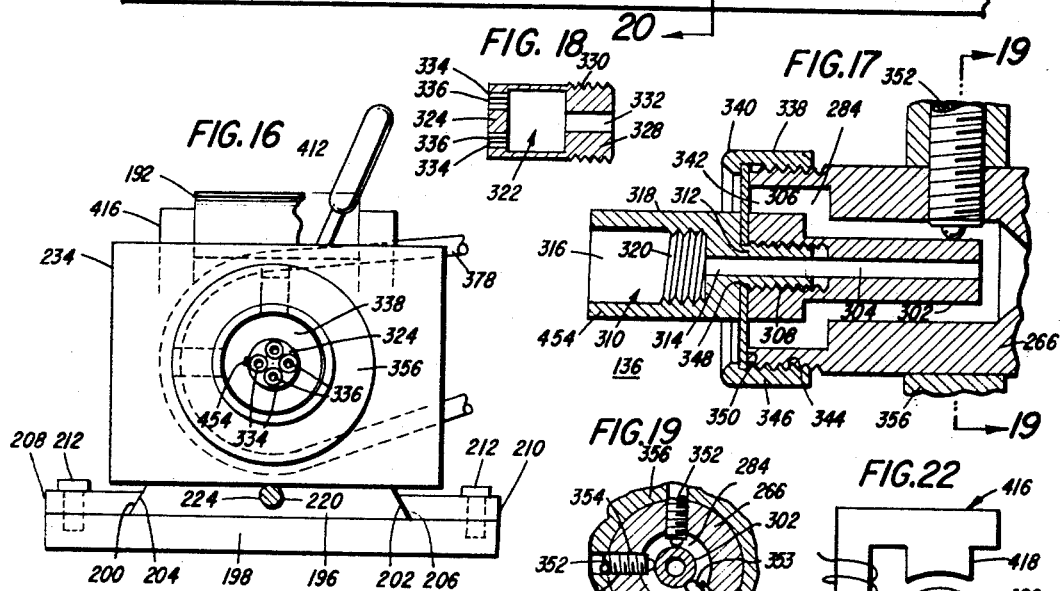
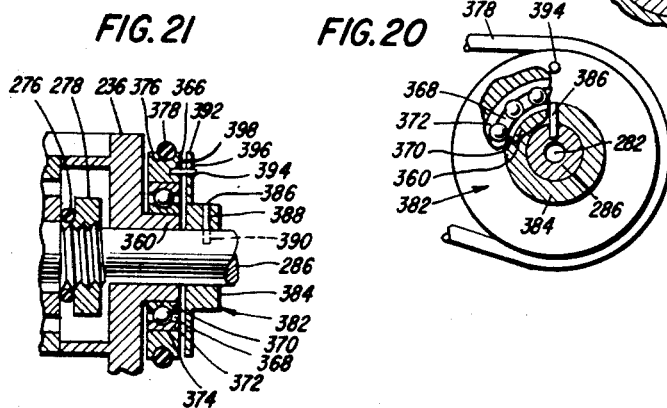

United States Patent Office 3,448,265
Patented June 3, 1969

3,448,265
PIEZO-ELECTRIC CRYSTAL MANUFACTURING APPARATUS AND METHOD FOR LOCATION OF ATOMIC PLANES RELATIVE TO THE CRYSTAL SURFACE
Wallace H. Samuelson, 240 Division St., Harrisburg, Pa. 17110
Filed June 1, 1966, Ser. No. 554,512
Int. Cl. G01n 23/20
U.S. Cl. 250—51.5
48 Claims

ABSTRACT OF THE DISCLOSURE

There is disclosed herein an apparatus and method for rapid and accurate location of atomic planes relative to an external surface of a specimen of a crystalline material by X-ray diffraction techniques. The apparatus includes an X-ray source, and X-ray detector, a specimen mounting fixture for continuously rotating the specimen about a line normal to an external surface in a constant plane relative to the incident X-ray, an adjustable supporting structure for the mounting fixture to permit adjustment of the angle between the axis of rotation of the specimen and the incident X-ray, independent of the rotation, and visual display means for the value of the adjusted angle and the pattern of X-ray diffraction from the crystalline specimen.

---

This invention generally relates to piezo-electric crystals and more specifically, to methods and apparatus by which the manufacture of piezo-electric crystals may be greatly facilitated. The invention relates also to piezo-electric crystals produced according to the above method and apparatus.

The use of piezo-electric crystals as frequency control elements in electronic oscillators is well known. Because of the extremely sharp mechanical resonance, and because of the coupling between mechanical and electrical properties, oscillators using such crystals as energy storage elements can provide constancy of frequency which far exceeds that obtainable with oscillators employing purely electronic energy storage elements. Such oscillators find wide-spread use as frequency synthesizers in carrier communication systems and as frequency standards where extreme accuracy is required.

Frequency stability is of considerable present importance in view of the increasing demands being made on the electro-magnetic spectrum, and increased government restrictions on frequency channel allocation. This results in requirements for extremely close tolerance and accurate frequency standards whereby a particular portion of the spectrum may be fully utilized without interfering with the concurrent use of adjacent portions of the spectrum.

The resonant frequency of a crystal will depend on a number of factors. For many crystals, e.g. thickness-shear, primary factor is the thickness; in general, the thinner the crystal, the higher will be its resonant frequency. However, the frequency is also governed by operating temperature, and in fact, for a given crystal, there is a measurable relationship between frequency of oscillation and temperature, characterized by a so-called temperature frequency co-efficient.

If the temperature of the crystal oscillator is precisely maintainable, then the oscillator will operate at any desired frequency within the limitations imposed by the dimensions of the crystal. Temperature stabilization is in fact commonly used to control the frequencies of crystal oscillators, and is quite satisfactory in many instances.

In other instances, however, this approach is entirely unsatisfactory since it requires a temperature compensating oven which not only imposes space and weight limitations, but also can impose rather substantial power demands, e.g. a small oven for a crystal oscillator may require 10 to 12 watts of power for operation.

Under those conditions where temperature control is impractical for the reasons outlined above, e.g. in small transistorized equipment, an alternative approach, namely that of temperature compensation, is often employed. The crystal to be used is tested at various temperatures, or its temperature-frequency characteristic otherwise determined, and a suitable non-linear impedance designed having a temperature-frequency characteristic inverse to that of the crystal, at least over the expected temperature range of oscillator operation. The so-designed impedance is then incorporated, along with the crystal, in the oscillator. In this way, the temperature-frequency curve for the crystal is effectively flattened over the expected temperature range to minimize variations in oscillator frequency.

Quartz is the most common piezo-electric material used in crystal oscillators. As is well known, a lump of quartz is characterized by a set of crystallographic axes, including an optical Z axis and three equivalent pairs of axes, orthogonal to the Z axis. One axis of each pair is denoted as the electrical axis (X axis) and the other the mechanical axis (Y axis). The most significant factor in determining the temperature-frequency characteristics of a crystal is the manner in which the blank is cut from the mother quartz relative to these axes. Detailed study has yielded considerable information as to the appropriate orientations, i.e., the angles at which the mother crystal should be cut relative to the X, Y, and Z axes thereof in order to produce blanks having the desired temperature characteristics for given applications. A large number of such orientations and their temperature-frequency characteristics have been considered.

As a practical matter, given the temperature-frequency characteristic of a particular "cut," i.e. crystal orientation, it is possible to design a standardized compensation circuit which may be used at all times with crystals of that type. The alternative approach of designing a compensation circuit in each instance to meet the demands of a randomly cut crystal, is simply not feasible from an economic standpoint. Thus, crystal users will normally demand that the characteristics of the crystals produced or bought be constant to within rather narrow tolerances so that the standardized compensation circuits may be used. Typical tolerance requirements may be ±0.5 minute of arc for the angles at which the crystal is cut.

In order to meet such tolerance standards, precision techniques for cutting the crystal blanks must be employed. Presently used optical techniques are satisfactory for determinig the orientation of the crystallographic axes of the mother crystal. The crystal may then be cut (e.g. by means of an accurately positionable saw) followed by various steps such as lapping, polishing, mounting, etc. Of these, the lapping steps are the most critical in determining the ultimate properties of the crystal.

Unfortunately, during lapping, the orientation of the crystal relative to the X, Y, and Z axes may change, causing gross variations in the temperature-frequency characteristics. It would be highly desirable to be able to predict the changes which take place during the lapping operations in order to determine when the desired properties are achieved. However, the magnitude of such changes are generally random, making prediction substantially impossible. Use of conventional optical techniques to locate the crystallographic axes subsequent to lapping is not possible due to the extremely small dimensions of the crystal.

When the crystal blank is square or rectangular it is some times possible to determine the crystal properties by means of X-ray diffraction techniques. It has been known for considerable time that the inter-atomic distances which characterize the crystal structure of quartz are such as to permit the diffraction of X-rays from the atomic planes defined by the structure of the crystal lattice. These atomic planes are oriented in known relationship to the crystallographic axes. This knowledge has been exploited with some success by the location of such atomic planes using a device known as an X-ray goniometer. Such a device is shown, for example, in U.S. Patent No. 2,585,916. In its simplest form, an X-ray goniometer comprises an X-ray source, an X-ray detector angularly positionable with respect to the line of incidence of the incoming X-rays, and an angularly positionable mounting fixture for holding the crystal in the incoming beam. Experience has shown that if the incident X-ray strikes a given atomic plane at one of a number of precisely determinable angles, constructive interference causes an X-ray beam to be diffracted therefrom at a predictable angle relative to the incoming beam. This is closely analogous to reflection of light from a surface, and in the following discussion the terms reflection and diffraction will be used interchangeably.

By positioning the detector at the expected angle of diffraction for a particular atomic plane and positioning the crystal in the incoming beam until a diffraction is detected, the orientation of the desired atomic plane relative to the external dimensions of the crystal may be determined. From this, the location of the axes may be found. However, X-ray goniometry as described above requires that a certain amount of information about the crystal be known, including the location of a reference edge. In the absence of this knowledge, analysis is extremely difficult.

In the manufacture of low frequency crystals, it is often possible to retain the required reference edge. However, for many applications, e.g. high frequency, thickness-shear crystals, it is desirable that prior to lapping, the crystal be formed into a thin circular wafer-like disc. In such crystals, which are of great commercial importance, it has heretofore been substantially impossible to check the crystal orientation during or after lapping, even by the above-mentioned X-ray techniques, because of the absence (due to the round configuration) of a reference edge. Moreover, even for square or rectangular crystals, conventional goniometry techniques are not completely satisfactory, due to the difficulty of obtaining accurate measurements.

In the case of round crystals, it has been proposed to modify the conventional X-ray goniometers or to otherwise provide for mounting of the crystal in the instrument in such a manner as to permit it to be angularly positioned about an axis normal to its face. Then the X-ray source and detector may be positioned relative to each other as described above. The crystal may then be positioned in the beam and its disposition around the normal to its face as well as its angular position in the beam concurrently varied while monitoring the X-ray detector (as by means of a meter) to determine the position at which the maximum X-ray intensity is detected. While this approach does in fact yield the desired result, namely the location of a particular atomic plane relative to the crystal face, the process is extremely laborious and time consuming due to the fact that two separate and independent variations in crystal disposition are to be made, and further because of the extreme accuracy with which the crystal position must be adjusted in order to achieve manufacturing tolerances of ±0.5 minutes of arc. Typically, in order to determine the orientation of a single crystal by this technique, as much as an hour or more is necessary, during which step-by-step positioning of the crystal around its face normal and angular positioning at each step must be carefully carried out in order to determine the point of maximum X-ray intensity.

A further limitation of this method lies in the fact that heretofore employed techniques and apparatus have not accurately provided an axis normal to the crystal face about which the crystal may be positioned. Thus, frequent recalibration is necessary to be certain that the crystal is being positioned about an axis exactly normal to the crystal face. This further adds to the difficulty of the proposed method.

Accordingly, for round crystals, or whenever extreme accuracy is desired, it has been the practice to lap the blank to a degree dictated by past experience, and then to continue on through the fabrication process until the crystal is completed. Then, the temperature-frequency characteristics of the finished crystal is measured, and crystals not meeting the required tolerances are discarded. Of course, it may be understood that under such circumstances, considerable loss of time and effort results from the necessity of completing the fabrication process on crystals which ultimately cannot be used. This has been a longstanding problem of extreme seriousness in the field of crystal manufacturing.

*The present invention*

In contrast to the above-described approaches, it has now been discovered that contrary to all prior belief, it is unnecessary for purposes of X-ray goniometry, that the crystal blank possess the above-mentioned reference edge. In fact, if an appropriate X-ray detector is correctly positioned relative to an incoming X-ray beam, then location of the crystallographic axes may be determined by placing the crystal in the beam, and continuously rotating it about an axis normal to its face while varying the angle between the normal and the beam. Specifically, the present invention is based on the following three discoveries:

(1) Under conditions of rotation such as described above, there exists a multiple-valued relationship between the angular position of the face normal relative to the beam, and the angular position (rotation about the face normal) at which X-ray diffraction can occur.

(2) For a crystal having a given atomic plane orientation, there is at least one readily identifiable angular position of the face normal itself, relative to the incident X-ray beam for which there is but a single value of the angular position about the face normal for which X-ray diffraction can occur.

(3) If the atomic plane is so situated that it intersects a face of the crystal in a line within, or substantially parallel to the face of the crystal to be irradiated, or if the departure from such parallelism is approximately known, then the orientation of the atomic plane relative to the crystal faces may be easily determined in most instances by a measurement of the angular position of the face normal which produces the above-noted single diffraction.

Thus, the existence of a reference edge, which heretofore has represented a most critical parameter in the X-ray analysis of the crystals, becomes substantially immaterial. It has been found that when a condition (3) set forth above is met, crystal blanks of either round or rectangular configuration may be rapidly and accurately measured at any stage of the fabrication process. For many commercially important crystal cuts, the above condition is either inherently satisfied or can be conveniently satisfied with no difficulty.

Even if condition (3) above is not satisfied, the techniques of the present invention are applicable and may be adapted in obvious fashion to obtain sufficient information for a relatively simple computation by which the orientation of the atomic plane relative to the crystal faces may be determined.

In utilizing the concepts of the present invention, there is employed an X-ray analysis apparatus including an X-ray generator, an angularly positionable X-ray detector, and an angularly positionable crystal mounting fixture.

The mounting fixture is arranged to permit continuous rotation of the crystal about a line exactly normal to the face thereof. The output of the X-ray detector is connected to a visual display device. Suitable circuitry is provided to generate a periodic time base signal in synchronism with the rotation of the crystal.

In operation, the crystal is set in rotation, and the angle between the incident beam and the face normal varied. The pattern which appears on the display device face possesses a unique appearance when the angle of the face normal relative to the incident X-ray corresponds to a single diffraction per rotation. At this point (when condition (3) is satisfied), the angle between the incident beam and the face normal is found to be additively related to the angle which characterizes the orientation of the atomic plane. Therefore, the face normal positioning means may be directly calibrated to read such angle.

In practice, the preliminary orientation and cutting steps are carried out, in any of a number of well known fashions, with special care being taken to assure that condition (3) is substantially satisfied. During these steps, the crystal may be made rectangular or circular. The lapping process is then carried out, during which the crystal is periodically analyzed in accordance with this invention. If the crystal orientation is satisfactory, the lapping process is continued.

If the crystal orientation is not proper, the lapping process is interrupted, and known angle correction techniques are employed to bring the orientation within the prescribed limits. Such angle corrections may be made any number of times as long as the crystal remains of sufficient thickness to meet the frequency requirement of the finished crystal.

Thus, only the properly oriented crystals proceed to the final stages of fabrication, including final polishing, mounting of electrodes, encapsulation, etc., whereby these latter costly and time consuming steps need only be carried out for those crystal blanks which are assured of being within the required tolerance limits for the standardized compensation circuits. The above generally described procedure, has been found to enhance the accuracy of the analysis of square and rectangular crystals, as well as to make possible the practical analysis of round crystals and also effects a substantial decrease in the cost and labor necessary to produce a given number of finished crystals having the required tolerance limits.

In addition to the above described features, a further feature of this invention resides in the manner of construction of the crystal mounting fixture to assure that the crystal will rotate about a line exactly normal to its face. The fixture is of novel design, and includes provision for conveniently and accurately orienting the axis of rotation, and for positioning the crystal to permit the impingement thereon of the X-ray beam in an appropriate location. It further provides means to rotate the crystal, including improved power transmission means to prevent changes of the orientation of the axis of rotation due to dynamic forces caused by the rotation thereof.

Another particular feature of the present invention resides in its usefulness as a tool for determining the flatness of the face of a particular crystal. Heretofore, such determinations have either been made mechanically, by the use of a pair of calipers or optically, by means of an interferometer. The former method suffers from the disadvantage that it is not in fact the flatness of the crystal face which is being measured, but the distance between the crystal faces, i.e., the thickness of the crystal. The optical method actually provides a measure of the flatness of the crystal face, however, its use requires that the crystal face which is being measured, either be polished, or otherwise made light reflective.

In contrast, by use of the present invention, the crystal blank may be mounted at a number of different positions on the crystal holder, and set in rotation at each such position. If the particular crystal face is flat, no changes will be observed in the display pattern. On the other hand, if the face is not flat, then the local angle between the atomic plane and the crystal face will not be the same at all points, and changes in the orientation of the crystal relative to the X-ray beam will be necessary in order to maintain an unchanging display pattern. The existence of changes in the diffraction pattern provides a rapid and convenient indication of the non-flatness of the crystal face.

It is accordingly an object of this invention to provide improved apparatus and techniques for the manufacture of crystals. It is also an object of this invention to provide crystals manufactured according to the improved techniques.

More specifically, it is an object of this invention to provide improved X-ray analysis techniques for use in the manufacturing of piezo-electric and other similar crystals. It is a related object of this invention to provide an apparatus in accordance with such techniques whereby to assure an accurate and rapid X-ray analysis of the properties of such crystals.

It is further an object of this invention to overcome the difficulties inherent in the prior techniques of X-ray analysis of crystals, including the complexity and time-consuming nature thereof. It is also an object of this invention to provide apparatus for the X-ray analysis of crystals which permits the convenient and accurate analysis of rectangular, and other crystals by relatively unskilled personnel.

It is a further general object of this invention to provide an apparatus which will provide an indication of the flatness of a crystal without the necessity of first polishing the crystal, or otherwise rendering it highly reflective.

It is a more particular object of this invention to provide an X-ray analysis apparatus including means to continuously rotate the crystal specimen about an axis normal to its face. It is a related object of this invention to provide an X-ray analysis appartaus which can be accurately adjusted to assure that the crystal axis of rotation and the axis normal to its face remain substantially coincident.

It is a further particular object of this invention to provide an X-ray analysis apparatus in which a continuously rotating crystal specimen is irradiated, and the X-ray diffraction therefrom visually analyzed by means of an oscilloscope. It is a related object of this invention to provide improved X-ray analysis techniques utilizing certain crystal properties heretofore unrecognized which permit rapid and convenient visual analysis of the crystal properties.

It is an additional object of this invention to provide a crystal analysis technique, an apparatus in accordance therewith which permits the temperature frequency characteristics of a piezo-electric crystal to be determined with great convenience and accuracy prior to the final assembly thereof, so as to eliminate the substantial cost attendant upon the assembly of unusable crystals. It is a related object of this invention to provide techniques and apparatus in accordance therewith, whereby the requirement of a crystal reference edge, heretofore thought essential, may be dispensed with, permitting the convenient analysis both of round crystals and rectangular crystals, with greater accuracy and simplicity.

It is a further object of this invention to provide techniques for X-ray crystal analysis, and apparatus in accordance therewith, directly usable for measurement of the properties of piezo crystals and the like, wherein an atomic plane thereof intersects a face of the crystal in a line parallel to the crystal face to be irradiated. It is a related object of this invention to provide techniques and apparatus in accordance therewith, additionally adaptable to the analysis of piezoelectric crystals and the like, wherein an atomic plane does not intersect a face of the crystal in a line parallel to the crystal face to be irradiated.

It is a further particular object of this invention to provide improved X-ray crystallography techniques and an apparatus in accordance therewith, including an X-ray source having direct current excitation, a scintillation counter positionable relative to the X-ray source, and a specimen holder permitting rotation of the crystal specimen about two different axes. It is a related object of this invention to provide apparatus as described above by which the crystal specimen may be continuously rotated about an axis normal to its face, whereby the angle of rotation about such axis at which X-ray diffraction may occur in a multiple valued function of the orientation of the axis relative to the incoming X-ray beam.

It is also an object of this invention to provide an apparatus as described above, wherein the above-noted multiple valued relationship is single-valued for one orientation of the axis relative to the X-ray beam and where such single valuedness is exploited in a novel manner to simplify and improve the techniques of X-ray crystallography. It is a related object of this invention to provide an apparatus as described above wherein the transition between the above-noted single and double valuedness is visually displayed for the use of the operator of the apparatus.

The exact nature of this invention as well as other objects and advantages thereof will be understood from the following detailed description and the accompanying drawings, in which:

FIGURE 6 is a representation of a conventional X-ray apparatus in accordance with the prior art by which crystals such as shown in FIGURES 4 and 5 may sometimes be analyzed;

FIGURES 9 and 10 are representations of important crystal configurations which can not practically be analyzed according to the prior art techniques described in connection with FIGURES 5 through 8;

FIGURE 11 is an overall plan view of the improved X-ray analysis apparatus according to the present invention;

FIGURE 12 is a side elevation, partially broken away, and partially in section showing the details of the construction and attachment of a portion of the apparatus of FIGURE 11;

FIGURE 13 is a side elevation of the X-ray detector housing of FIGURE 11 showing the manner of attachment thereof to the remainder of the instrument;

FIGURE 14 is an expanded, partially cut-away view of a portion of FIGURES 11 and 12 showing the mechanism for adjusting the position of a crystal specimen in the X-ray beam;

FIGURE 15 is a sectional view of the crystal holder and rotating mechanism shown in FIGURE 11;

FIGURE 16 is a front elevation of the crystal holder apparatus shown in FIGURE 15;

FIGURE 17 is an expanded sectional view of the vacuum chuck used to actually support the crystal specimen on the crystal holder shown in FIGURES 14 and 15;

FIGURE 18 shows the end portion of the vacuum chuck shown in FIGURE 17, removed therefrom for purposes of clarity;

FIGURE 19 is a further sectional view taken along line 19—19 in FIGURE 17, showing the manner in which the axis of rotation of the crystal holder is adjusted to coincide with a line normal to the face of the crystal specimen to be analyzed;

FIGURE 20 is a partially sectional and partially cutaway view taken along line 20—20 in FIGURE 15, showing the construction of the power pick-up mechanism;

FIGURE 21 is an expanded view of a portion of FIGURE 15 showing the details of the power pick-up mechanism;

FIGURE 22 shows the construction of the synchronizing pulse generator of FIGURES 15 and 16;

FIGURES 23–25 depict certain physical characteristics of crystals such as shown in FIGURES 4, 9, and 10 pertinent to the methods of the present invention; and FIGURES 26a–26d show various oscilloscope traces which are used to determine the crystal properties in accordance with this invention.

*Detailed description*

Figure 1:
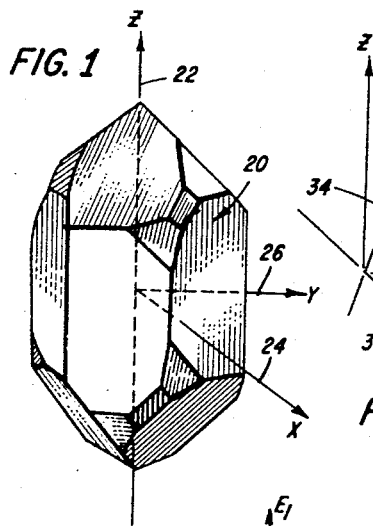
FIGURE 1 is an idealized representation of a quartz crystal.

Referring first to FIGURE 1, there is shown an idealized quartz crystal denoted as 20, including an optical Z axis 22, and electrical X axis 24, and a mechanical Y axis 26. Such crystals are not found in nature; however, the configuration shown is often found in the literature and serves to emphasize the symmetry of the crystal, as well as to establish a suitable framework for the following discussion of crystal properties.

The quartz crystal is characterized by a single axis of three-fold symmetry, i.e. the Z axis and three axes of two-fold symmetry, e.g., the X axis positioned at 120 degree intervals in a plane perpendicular to the Z axis. As indicated above, location of these axes permits accurate control of crystal properties, such as the temperature-frequency characteristic. Techniques are known in the art of crystallography by which these axes may be located, notwithstanding the fact that naturally occurring quartz seldom attains a degree of symmetry even remotely approaching that of crystal 20. Such techniques are described, for example, in "Quartz Crystals for Electrical Circuits" by Raymond A. Heising, Chapter II, especially pages 57 through 91, and Chapter IV, especially pages 145 through 152.

Figure 2:
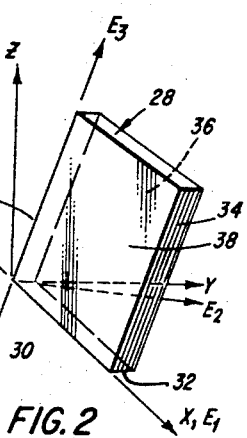
FIGURE 2 is a representation of a particular crystal blank, i.e. a small slab cut in a predetermined manner from a crystal such as that shown in FIGURE 1.

Having determined the location of the crystallographic axes in the naturally occurring lump of quartz (herein denoted as a "mother crystal"), it may then be cut into thin plates or blanks, such as 28 shown in FIGURE 2. Blank 28 represents one of the many possible ways in which the mother crystal 20 may be cut to produce particular temperature-frequency characteristics for the finished crystal. Three of the edges of crystal blank 28, e.g., edges 30, 32 and 34, may be thought of as defining an orthogonal coordinate system comprising a set of axes denoted as $E_1$, $E_2$, and $E_3$, lying along crystal edges 30, 32, and 34, respectively. The back face 36 of the crystal lies in the $E_1$–$E_3$ plane, while the front face 38 is disposed parallel to face 36 at some distance along the $E_2$ axis which defines the thickness of the crystal.

As may be seen from FIGURES 1 and 2, the orientation of blank 28 relative to mother crystal 20 may be completely specified in terms of the angles between the X and $E_1$ axes, the Z and $E_3$ axes and the Y and $E_2$ axes.

The angle between $E_3$ and Z axes has been found to be the most critical in determining the temperature-frequency characteristic of the finished crystal. Orientations such as that shown in FIGURE 2 in which the $E_1$ and X axes coincide, are of substantial commercial importance, especially since it is generally found that the angle between the $E_1$ and X axes causes only secondary effects on the temperature-frequency characteristics of the finished crystal.

After the crystal is cut as shown in FIGURE 2, the faces 36 and 38 of blank 28 are machined to adjust the crystal thickness to that required for the desired frequency of oscillation. This is accomplished by lapping the crystal according to known techniques (see, for example, Heising, supra, Chapter IX, p. 290). Based on the speed of rotation of the lapping wheel, and abrasive material used, etc., suitable lapping time necessary to achieve a particular crystal thickness may be calculated.

Figure 3:
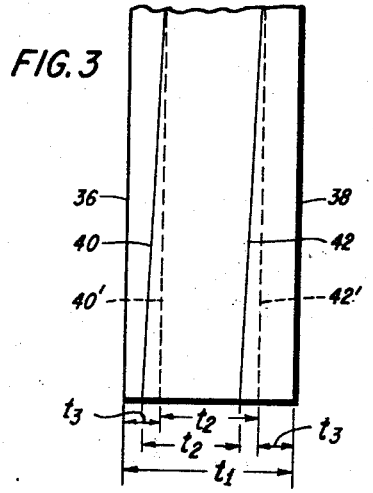
FIGURE 3 is an expanded and exaggerated view of a portion of the crystal blank shown in FIGURE 2 indicative of one of the difficulties encountered in the processing thereof.

However, due to the techniques employed, and to variations in crystal hardness, it is often the case that removal of material is not uniform over the entire area of crystal faces 36 and 38. FIGURE 3 is a diagram of a portion of the $E_2$-$E_3$ plane of crystal blank 28, showing the effect of such non-uniform lapping. While FIGURE 3 is enlarged, and somewhat exaggerated for purposes of clarity, it should be recalled that modern compensated crystal circuits require fabrication tolerances in the finished crystal on the order of only plus or minus 0.5 minute of arc. For purposes of explanation, let it be assumed that in order to achieve the desired frequency of oscillation, the initial blank thickness $t_1$ must be reduced to the smaller thickness $t_2$, by the removal of a thickness $t_3$, from front and back faces 36 and 38, shown in FIGURE 3. Unfortunately, known lapping techniques cannot always produce the desired result. In reality, lapping sufficient to remove the desired amount of material, i.e. a thickness $t_3$ from each face, may cause a diagonalizing of the crystal. This results in a lapped blank, the faces 40 and 42 of which are angularly disposed, rather than normal to the $E_2$ axis (as shown by lines 40' and 42' in FIGURE 3). While the blank may be of the proper thickness $t_2$, it may be seen that the orientation thereof is such that the edges of faces 40 and 42 in the $E_2$-$E_3$ plane, are no longer parallel to the $E_3$ axis, and therefore, the original orientation of the crystal relative to the Z axis, i.e. the angle between the crystal face and the Z axis (see FIGURE 2) is lost. This, of course, results in a change of the temperature-frequency characteristic of the crystal which was "designed in" by the orientation at which blank 28 was originally cut.

The variations shown in FIGURE 3 are generally unpredictable, and therefore, it is vitally necessary in order to produce a crystal within the required tolerance, to determine the orientation of the blank relative to the X, Y, and Z axes during or immediately following the completion of the lapping process. Unfortunately, due to the small thickness of the blank, it is no longer possible to use the optical methods outlined in Heising supra, and attempts have been made to employ X-ray diffraction techniques for this purpose.

Figure 4:
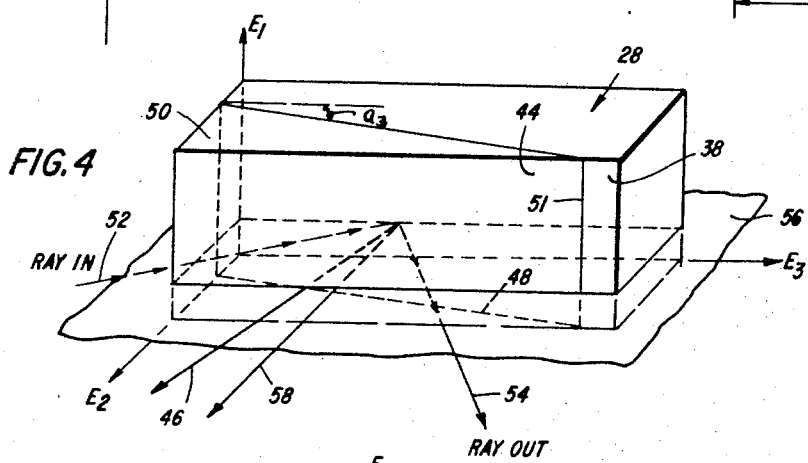
FIGURE 4 is a schematic view of the crystal blank shown in FIGURE 2, showing certain properties thereof.

FIGURE 4 is a further representation of crystal blank 28, showing one of the atomic planes 44, defined by the inherent lattice structure of the crystal. In order to simplify the discussion, plane 44 will be assumed to be disposed in parallel relation to the X axis although other planes may be employed in X-ray diffraction measurement, as will be understood by one skilled in the art in light of the present disclosure.

In FIGURE 4 are also shown the $E_1$, $E_2$ and $E_3$ axes, previously defined, and a line 46 normal to atomic plane 44 extending outward through the crystal face 38. Atomic plane 44 intersects the $E_2$-$E_3$ plane of the crystal in a line 48, making an angle $a_3$ with the $E_3$ axis. Atomic plane 44 also intersects the $E_1$-$E_2$ plane of the crystal lying in a line 50, parallel to the $E_1$ axis. Thus it will be understood, that atomic plane edge 50 and a corresponding parallel edge 51 are disposed normal to the $E_2$-$E_3$ plane of blank 28. A first X-ray beam is shown to be incident upon atomic plane 44 along a line 52, while a second X-ray beam is reflected from the atomic plane 44, along a line 54. It has been found in such situations that the incident beam 52, and the reflected beam 54, are coplanar with the atomic plane normal 46. This common plane is denoted in FIGURE 4 as 56, and also includes a line 58, disposed normal to the crystal face 38 and at an angle $a_3$ from atomic plane normal 46.

Figure 5:
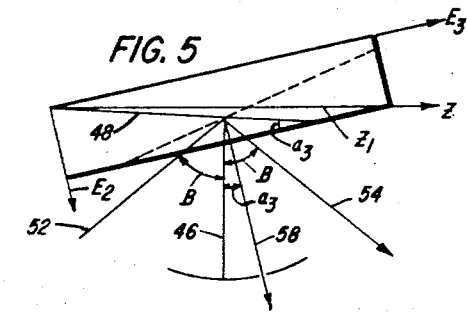
FIGURE 5 is a sectional view taken parallel to the bottom plane of the crystal shown in FIGURE 4.

FIGURE 5 is a sectional view at plane 56 of the crystal blank 28 shown in FIGURE 4. As may be seen, the incident and reflected X-ray beams 52 and 54 make angles B with the atomic normal 46, which atomic normal is disposed at an angle $a_3$ from face normal 58. According to conventional techniques, measurement of the angle $a_3$ may sometimes be accomplished by the use of an X-ray goniometer such as that shown in FIGURE 6.

The instrument denoted generally as 60 comprises a supporting structure 62 including a fixed arm 64 which carries an X-ray source 66, and a mounting frame 68 for supporting the remainder of the apparatus. A first moveable arm 70 carries an X-ray detector 72 while a second moveable arm 74 carries a crystal holder 76.

The crystal specimen (e.g. crystal blank 28 shown in FIGURE 4) is mounted with the $E_2$-$E_3$ face thereof on a flat surface 78 of crystal holder 76 (often denoted as "the plane of the instrument") and with the $E_1$ axis parallel to a vertical axis 80 about which the specimen may be positioned. Since edges 50 and 51 of the atomic plane 44 are parallel to the $E_1$ axis, (see FIGURE 4), crystal face normal 58 and atomic plane normal 46 will define a plane parallel to the $E_2$-$E_3$ plane, which plane will also include the X-ray line of incidence 52, and the line of reflection 54. As is known to those skilled in the art, a given atomic plane such as 44 will be disposed at some known angle relative to the Z crystallographic axis, as shown in FIGURE 5. The angle between the crystal face 38 and atomic plane 44, i.e., the angle $a_3$, is determined as explained below; therefore, the angle between the Z axis and crystal surface 38 may simply be found by addition.

For a crystal such as shown in FIGURE 4 where the atomic plane 44 intersects one or more crystal faces in lines perpendicular to one or more other crystal faces, (e.g. lines of intersection 50 and 51 are normal to the $E_2$-$E_3$ plane) conventional techniques of goniometry may be carried out as follows:

The crystal blank 28 is mounted with the $E_2$-$E_3$ plane in/or parallel to the plane of the instrument 78 and with the $E_1$ axis parallel to axis 80. Arm 70 and detector 72 are positioned so that radial line 54 (i.e. the line of X-ray reflection shown in FIGURE 5) makes an angle 180—2B with the extension 83 of incident X-ray beam 52. Thus, when arm 74 is positioned so that atomic normal 46 exactly bisects the angle between lines 52 and 54 as shown in FIGURE 5, if the angle of incidence B so produced is equal to one of the allowable angles for X-ray reflection, a beam along line 54 will be detected. Since crystal blank 28 is freely rotatable about axis 80, it may be seen that the orientation of atomic normal 46 relative to incident beam 52 may be adjusted until the proper angle of incidence is achieved. This condition is detected on a meter connected to the output of detector 72 and by moving arm 74 and attached holder 76 until a maximum meter reading is found. The angular position of arm 76 is read on a suitable scale 84 on frame 68.

The crystal is then "flipped" exactly 180 degrees about face normal 58, i.e. the upper edge 82 of specimen 28 is placed on plane 78. This results in a re-orientation of atomic plane 44, as shown by line 44' in FIGURE 7. Thus, it may be seen that the atomic normal 46 no longer exactly bisects the angle between lines 52 and 54, therefore, no X-ray reflection is produced along the latter.

Figure 7:
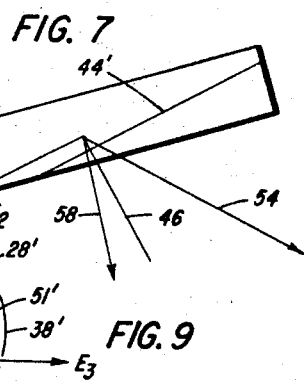
FIGURES 7 and 8 are further sectional views of the crystal of FIGURE 4 in connection with which are explained conventional techniques for X-ray crystal analysis.
Figure 8:
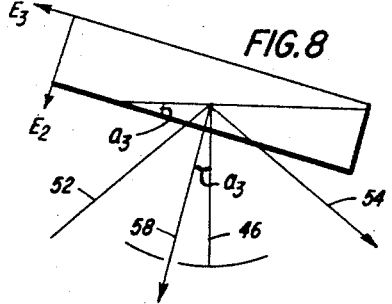

From comparison of FIGURES 5 and 7, it may be seen that line 44' is disposed at an angle $2a_3$ from line 44. Therefore, in order to achieve the condition in which atomic normal 46 again bisects the angle between lines 52 and 54, the crystal must be rotated about axis 80 (FIGURE 6) by an angle exactly equal to the angle $2a_3$. This condition is shown in FIGURE 8. Accordingly, after the crystal has been inverted 180° about face normal 58 (FIGURE 7), arm 74 (FIGURE 6) is repositioned until a reflected beam is again detected, and the new angular position of arm 74 relative to scale 84 is noted. Since the change in the angular position is exactly $2\alpha_3$, the value of the angle $a_3$ and the angle between crystal face 38 and the Z axis may be readily determined.

From consideration of FIGURE 4 it may be understand that the specimen 28 must be placed in holder 76 with lines of intersection 50 and 51 parallel to the vertical axis 80 about which the crystal is rotated, i.e., normal to the plane of the instrument 78. If lines 50 and 51 are not in fact so positioned, X-ray beams 52 and 54 will not lie in a plane parallel to the plane 78. Thus, under such conditions detector 72 may have to be raised or lowered and the position of arm 70 varied to permit the reflected beam to be detected. This will make it extremely difficult as a practical matter to determine the proper location of detector 72. Unfortunately, such a situation is often encountered.

The simple case in which the crystals possess a reference surface normal to the lines of intersection 50 and 51, e.g. $E_2$–$E_3$ plane shown in FIGURE 4, of course provides assurance that such a condition does not exist since the $E_2$–$E_3$ plane will rest on the plane of the instrument 78 when the crystal 28 is in position thereon. However, in the event that the crystal is round such as that shown in FIGURE 9, or if the atomic plane 88 is oriented as shown in FIGURE 10 with its line of intersection 92 not disposed normal to the $E_2$–$E_3$ plane, then it may well be extremely difficult to determine the proper location at which the X-ray detector should be positioned in order to receive the reflected X-ray.

Figure 9:
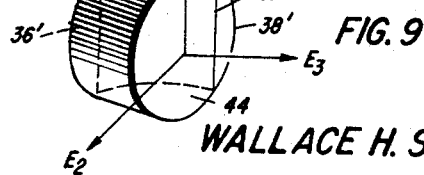

The crystal 28' shown in FIGURE 9, has been cut in the shape of a thin disc having faces 36' and 38' (corresponding to faces 36 and 38 in FIGURE 4) parallel to the $E_1$–$E_3$ plane. While the atomic plane 44' intersects front face 38' in a line 51' parallel to the $E_1$ axis, since the location of the $E_1$ and $E_3$ axes are not known, the orientation of line of intersection 51' is also not known and therefore crystal specimen 28' cannot be readily positioned in goniometer 60 with the line of intersection 51' normal to the plane of the instrument 76. Accordingly, none of the aforementioned X-ray techniques are useful with round crystals such as 28'.

Rectangular crystal specimen 86 (FIG. 10) is similar to that shown in FIGURE 4. However, in specimen 86 the atomic plane 88 is so oriented that the line of intersection 90 in the $E_2$–$E_3$ plane is disposed at an angle $a_3$ from the $E_3$ axis while the line of intersection 92 in the $E_1$–$E_2$ plane is disposed at some angle $a_1$ from the $E_1$ axis. Thus, it may be seen that even if the $E_2$–$E_3$ plane is parallel to the plane of the instrument 78 when the crystal is inserted in the goniometer, nevertheless, the plane including the incident beam 52 and the atomic plane normal 46 will no longer be parallel to plane 78.

Conventional goniometry techniques may be adapted for use with crystals having the configuration shown in FIGURE 10. However, as may be seen from the discussion in Heising, especially at pp. 112 thru 128, the process is extremely complex when the crystal does not possess the simple configuration of FIGURE 4 and simply cannot be used on anything approaching a commercial basis.

In the case of round crystals such as shown in FIGURE 9, an obvious modification of the techniques described in connection with FIGURES 5 through 8 has been proposed as indicated in the introductory discussion above. This involves the adaptation of the instrument 60 shown in FIGURE 6 to permit the positioning of the specimen 28 within its mounting fixture not only about vertical axis 80 but also about an axis 92 which coincides with the face normal 58 of the crystal when it is properly positioned in the instrument. With such a modification, the crystal may be positioned at various angles about its face normal to vary the disposition of the lines of intersection between the atomic plane and the crystal face until the same are disposed vertically, i.e., normal to the plane of the instrument. When the lines of intersection are vertically positioned, the crystal may be positioned as before so that atomic normal 46 does exactly bisect the angle between the lines of incidence and reflection of the desired X-ray beam, so that an X-ray will be reflected.

As may be seen from the above, this technique requires two independent and continuous adjustments of the crystal orientation relative to the instrument during measurement, i.e., about vertical axis 80 and about normal axis 92. This technique is extremely time-consuming, requiring as much as an hour or more to determine the orientation of a single crystal. Moreover, no apparatus used in accordance with this approach has successfully overcome the problems of assuring that the axis of rotation 92 is in fact exactly normal to the face of the crystal (i.e. parallel to face normal 58). Should this latter condition not be satisfied, it may be seen that upon positioning the crystal around axis 92, it may be difficult, if not impossible, to achieve a condition in which the lines of intersection between the atomic plane and the crystal faces are in fact normal to instrument plane 78. In other words, as specimen 28 is positioned about line 92, it will wobble, and there will be no assurance that the lines of intersection are in fact normal to instrument plane 78. Accordingly, the plane including the incident X-ray beam and the atomic plane normal would not be parallel to the plane 78, and the above noted problems incident to the analysis of crystals such as shown in FIGURE 10 would remain.

Thus, the above described approaches to the problems of crystals orientation have offered little in the way of practical solutions to the real and pressing crystal manufacturing problems, namely, how to rapidly, accurately, and cheaply determine whether a particular lapped crystal blank will produce crystals having the temperature-frequency characteristics within extremely narrow tolerances so that crystals may be manufactured on a mass production basis for the temperature compensated circuit techniques now in use.

The techniques of the present invention provide a long-sought solution to these problems by the discovery that there exists another approach to crystal analysis which does not require that the specimen be positioned in the measuring instrument with a line of intersection of the atomic plane and the crystal faces normal to the plane of the instrument.

Referring now to FIGURES 11 and 12, there is shown one suitable embodiment of an X-ray analyzer according to the present invention. The apparatus, generally denoted at 94, includes an X-ray generator 96 and a collimator 98 associated therewith for directing a narrow X-ray beam 100 toward a crystal specimen 102, the properties of which are to be determined. X-ray generator 96 and collimator 98 are fixedly attached to a base plate 104 supported, as by a pedestal 106, extending from the top of the cabinet 108, or other enclosure for the electronic equipment necessary to generate the X-ray beam.

The X-ray source may be of the type conventionally used in crystal analysis, for example, an apparatus wherein X-rays are generated by the impingement of an electron beam at approximately 35,000 volts on a copper target is satisfactory. However, A.C. acceleration of the electron beam as commonly employed has been found to be undesirable in the apparatus shown in FIGURE 11. Therefore, it is preferable according to this invention, that a constant D.C. acceleration voltage be employed.

The apparatus further includes an X-ray detector 110 mounted in a closed housing 112 and having a vertical slot 114 in the front face 116 thereof, whereby the reflected X-ray beam is admitted.

The X-ray detector 110 is preferably of the scintillation counter type, including a sodium iodide crystal and photo-multiplier combination or the like. Performance of the system as described below has been found to be greatly degraded or the system even rendered inoperative if ionization detectors or Geiger-Muller type detectors are employed, which has heretofore been the common practice.

As shown in FIGURE 13, detector housing 112 includes a downwardly depending support bracket 118 having a U-shaped extension 119 at the bottom thereof, having a lower arm 120 and an upper arm 121, extending longitudinally of the detector housing 112. A locking screw 122 extending through an aperture 123 in arm 120 and engaging a threaded recess 124 in arm 121, passes through an arcuate slot 125 in instrument base plate 104 for locking detector housing 112 in place. A further aperture 126, and an aligned recess 127 on arms 121 and 120 respectively is adapted to be aligned with one of a further series of apertures 128 in base plate 104 and to receive therethrough a positioning pin 129 for accurately determining the location of detector 110 relative to the X-ray source 96.

As previously indicated, an X-ray reflection is found to occur only for certain angles of X-ray incidence. In order to adjust this angle, crystal analyzer 94 includes a turntable 130 attached to the top of a vertical spindle 132, rotatably mounted on pedestal 106. Turntable 130 carries a crystal holder and rotating mechanism 134 including a vacuum chuck 136 for supporting crystal specimen 102 in the incoming X-ray beam and rotating it about a line normal to its face as described below.

Bolted to the periphery of turntable 130 is a radially extending arm 138 which serves as a lever for rotating the turntable on spindle 132. A pair of fixed arms 139 and 140 extend outward from the periphery of base plate 104 and serve to support a graduated arcuate member 142. The latter cooperates with a pointer 144 at the outer end of turntable arm 138 to provide an indication of the angular disposition of turntable 130 and attached arm 138.

In addition, and in order to achieve greater accuracy there is preferably included a precision dial indicator 146 of conventional construction, appropriately calibrated in minutes of arc, attached to fixed arm 139 by means of a bracket assembly 148 shown in FIGURE 14. Dial indicator 146 is operated in conventional fashion by an extensible shaft 150 abutting against an anvil 152 attached to turntable arm 138. Thus, when the angular position of arm 138 is varied, shaft 150 is extended or retracted, which movement is converted into angular information by the aforementioned calibration of the dial indicator.

In order to effect an extremely fine positioning of turntable arm 138, there is provided an adjusting assembly 154 shown in detail in FIGURES 12 and 14. A horizontal plate 156 is attached to fixed arm 139 by a support member 158, and engages with a friction drive assembly 160 attached to turntable arm 138. Friction drive assembly 160 includes an adjusting knob 162, a speed reduction mechanism 164, and a drive member 166. Reduction mechanism 164 which may be a planetary gear train of conventional design is driven by a shaft 170 connected to adjusting knob 162. The output of planetary gear train 164 is connected through a further shaft 172 to drive member 166 which may comprise a pair of flexible wedgelike plates 174 and 176 closely spaced on shaft 172 to securely engage the edge 178 of horizontal plate 156. Planetary gear 164 is rigidly supported on moving arm 138 in any convenient manner, as by one or more legs 180 mounted on a transverse extension 182 at the end thereof. The lower end of shaft 172 is also supported on transverse extension 182 in a recess 184 to permit the rotation thereof under the influence of adjusting knob 162.

The output of X-ray detector 110 is connected to a small current meter 186, which provides an indication of the intensity of the detected X-ray beam. In conventional X-ray goniometers, a meter such as 186 serves as the sole indicator of reflected X-ray intensity; however, in the present invention, the meter 186 serves only as a convenient means for calibrating the apparatus, as explained below. As will also be explained below, the techniques of the present invention depend in large measure on the ability of the user to visually distinguish certain unique X-ray reflection patterns. Thus, according to the present invention, actual analysis of crystal properties is accomplished by means of a cathode ray device 188, or the like having a vertical deflection circuit 190 driven by the output of X-day detector 110.

A time base for cathode ray device 188 is provided externally by a magneto type signal generator 192 described in connection with the crystal holder and rotating mechanism 134 below.

In FIGURES 15 through 21 are shown the details of the crystal holder and rotating mechanism indicated generally at 134 in FIGURE 11. Holder 134 comprises a main housing block 194 having a shoe 196 attached to the bottom thereof. Shoe 196 is slidably mounted on a support shelf 198 attached to turntable 130 (see FIGURE 11). A pair of outwardly sloping side edges 200 and 202 of shoe 196 engage the undercut edges 204 and 206 of a pair of gibs 208 and 210 respectively, releasably attached, as by bolts 212, to shelf 198.

As shown in FIGURE 11, support shelf 198 further includes a flat extended portion 214 having an upwardly extending end 216. The latter includes an aperture 218 aligned with a threaded recess 220 in the front of shoe 196. A shaft 222 is received through aperture 218 and threadedly engages the walls of recess 220. The shaft terminates beyond the upwardly terminating end portion 216 of support shelf 198 in an enlarged knob 224 which limits the movement of the shaft and provides a convenient means for the rotation thereof. As may be understood, the threaded end portion 226 of shaft 222 acts as a lead screw to adjust the position of housing block 194 in the track between gibs 208 and 210. The above described adjustment serves to compensate for variations in crystal thickness, as explained below. Housing 194 may be locked by tightening bolts 212 whereby to firmly engage gibs 208 and 210 against the sloping edges 200 and 202 of shoe 196.

Main housing 194 is preferably of unitary construction having therein a cavity 228 closed at its front and rear ends 230 and 232 by means of a pair of end plates 234 and 236 respectively.

Front end plate 234 includes a circumferential rib 238 spaced inwardly from the periphery of the plate a sufficient distance to permit the outer surface 240 thereof to fit snugly against the wall 242 of housing block cavity 228. Rear end plate 236 includes a rib 244 similarly positioned to fit within the rear end 232 of housing block 194.

The inner edges 246 and 248 of ribs 238 and 244 respectively serve to support thereagainst a pair of ball bearing assemblies 250 and 252 for rotatably supporting a vacuum chuck mounting shaft 254. The outer races 256 and 258 of bearings 250 and 252 respectively are adapted to rest against edges 246 and 248 of retaining ribs 238 and 244 and are separated by a cylindrical spacer element 260 positioned in cavity 228 therebetween. Thus, when end plates 234 and 236 are attached to main housing block 194, as by a plurality of screws, not shown, bearings 250 and 252 will be locked in position between the inner edges of retaining ribs 238 and 244 and the cylindrical spacer 260.

End plates 234 and 236 include apertures 262 and 264, respectively, which receive therethrough the outer portions of mounting shaft 254. The shaft itself comprises a forward portion 266 rotatably positioned in front end plate aperture 262 and extends outwardly a sufficient distance to provide a suitable support for vacuum chuck 136, as explained below. Behind forward portion 266 is a central portion 268 of reduced diameter fitted within the inner races 270 and 272 of front and rear bearings 250 and 252 respectively. A shoulder 274 at the junction of forward and central shaft portions 266 and 268, abuts inner race 270, and is firmly supported thereagainst by an O ring 276 and a nut 278 on threaded end 280 of central shaft portion 268 when the latter is firmly tightened down.

Shaft 254 includes an axial passage 282 extending therethrough and opening into an enlarged chamber 284 in forward shaft portion 266. The right hand end of axial passage 282 extends through a rear portion 286 of shaft 254, and communicates with a cavity 288 in a vacuum head 290 attached as by screws 292 to a fixed support member 294 positioned on shoe 196. Vacuum head 290 includes a pressure fitting 296 attached by a hose 298 to a vacuum pump 300 (see FIGURE 11).

With reference to FIGURES 17 through 19, vacuum chuck 136 mounted in forward shaft portion 266 comprises a first generally cylindrical tubular member 302 having therethrough an axial passage 304. The left hand end 306 thereof is radially expanded, and includes an internally threaded portion 308 communicating with axial passage 304. Vacuum chuck 136 also includes a second generally cylindrical tubular member 310 including an externally threaded righthand end portion 312 of reduced diameter adapted to engage the internally threaded end 308 of first tubular member 302. Second tubular member 310 includes an axial passage 314 communicating with axial passage 304 when members 302 and 310 are connected. Second tubular member 310 also includes an enlarged cavity 316 at its forward end 318. The side walls of cavity 316 are internally threaded at 320 for securing thereto an insert 322 shown in FIGURE 18.

Insert 322 is of generally cylindrical configuration and includes a front wall 324 having therein a number of orifices 326. Insert 322 further includes a rear portion 328 externally threaded at 330 and adapted to be engaged with the internally threaded wall 320 of cavity 316. Insert rear portion 328 includes a short passage 332 axially aligned with previously described passages 304 and 314 in tubular members 302 and 310.

To provide an accurately aligned surface against which the crystal may be positioned, a plurality of sapphire bearings 334 having small openings 336 therein may be mounted in orifices 326 in the front wall 324 of insert 322.

Vacuum chuck 136 is mounted within forward shaft portion cavity 284 by a retaining collar 338 having an inwardly bent lip 340 at the lefthand end thereof and by a flexible metal diaphragm 342 as shown in FIGURE 17. Forward shaft portion 266 is externally threaded at 344 for engagement with an internally threaded wall 346 of retaining collar 338. Diaphragm 342 is preferably a flexible beryllium-copper disc having therein an aperture 348 of sufficient diameter to receive the threaded end portion 312 of front tubular member 310. The diameter of diaphragm 342 is equal to that of forward shaft portion 266 so that it may be retained between lip 340 and the front end 350 of forward shaft portion 266. Disc 342 is held firmly in place between front and rear tubular members 302 and 310 whereby the entire vacuum chuck assembly 136 is supported in forward shaft portion cavity 284.

Diaphragm 342 is of sufficient thickness to firmly support vacuum chuck 136, but is also thin enough to permit flexing thereof under the influence of a plurality of adjusting screws including a first pair of screws 352 carried in a plurality of apertures 354 disposed at 90° relative to each other and a further spring loaded screw 353 carried in an aperture 355, located 135° from apertures 354 in an adjusting collar 356 on forward shaft portion 266.

As will be recalled, it is of critical significance, and in fact, the construction of the crystal holder assembly 134 is primarily intended to assure that the axis of rotation of the crystal specimen 102 is exactly normal to the crystal face. To this end, adjusting collar 356 is so positioned that apertures 354 are in alignment with a corresponding series of apertures 358 extending radially through the forward shaft portion 266. Adjusting screws 352 are of sufficient length to contact vacuum chuck inner tubular member 302 and to apply radial forces thereto at 90° angles whereby the vacuum chuck 136 may be pivoted about the flexible diaphragm 342 to accurately align the rotational axes of shaft 254 and vacuum chuck 136. As explained hereinafter, alignment of vacuum chuck 136 and rotating shaft 254 may be checked periodically and adjusted if necessary to assure accurate operation of the apparatus according to this invention.

Referring again to FIGURE 15, integral with back end plate 236 is a cylindrical collar 360 having therethrough an aperture 362 which forms an extension of aperture 264 in the back end plate 236 itself. A pulley 366 is attached to collar 360 by means of a ball bearing assembly 368, the inner race 370 of which is tightly fitted around collar 360, and the outer race 372 of which is tightly fitted within a suitable aperture 374 in pulley 366 (see FIGURE 21).

A groove 376 around the periphery of pulley 366 receives a driving belt 378. As shown in FIGURE 11, a shaft driving motor 380, mounted on crystal holder 134 as by a transverse bracket 382 on shoe 196 is attached to belt 378. Motor 380 may be of any suitable type; however, it has been found that most satisfactory operation is obtained if the speed of rotation is between approximately 1000 and 2500 r.p.m. For example, in one operative embodiment, a speed of approximately 1200 r.p.m. is successfully employed.

It has been found that when motor 380 is operating, dynamic forces directed along belt 378 have a tendency to cause a slight misalignment of shaft 254 and vacuum chuck 136 which may affect the accuracy of operation. In order to avoid the possibility that such dynamic forces will be transmitted to the rotating shaft, the pulley 366 is not directly connected to the rotating shaft, but rather to main housing block 194 through pulley bearing 368 and cylindrical collar portion 360 of back end plate 236. In order to transmit power to the shaft, a power pick-up disc 382 shown in FIGURES 15, 20, and 21 is preferably employed.

The power pick-up disc 382 comprises a cylindrical collar 384 rigidly attached to rotating shaft rear portion 286 as by means of a pin 386 extending through an aperture 388 in the collar and an aligned recess 390 in the rotating shaft 254. Disc 382 further includes a radially extended front portion 392 which is rigidly connected to pulley 366, again, as by a pin 394 extending through an aperture 396 in the disc portion 392, and an aligned recess 398 in the pulley itself. Thus, it may be seen that dynamic forces which might tend to misalign the rotating shaft 254 are transmitted to housing 194 while only rotational forces are transmitted through the power disc 382. Of course, other equivalent means for preventing angular misalignment may be employed as will be understood by one skilled in the art.

Mounted on sliding plate 196 is a supporting bracket 294 for the magnetic pulse generator 192 which provides the sweep driver signal for display unit 188. The support bracket includes an aperture 400 for receiving the end portion 286 of the rotating shaft 254. As previously mentioned, vacuum head 290 is also secured to support bracket 294. In order to provide an air tight seal, bracket 294 and head 290 are separated by a sealing washer 402 comprised of Teflon or like material.

The pulse generator itself includes an aluminum supporting frame 404 which is received within support bracket aperture 400 and includes a small circumferential groove 406 adapted to engage a spring loaded pin 408 located in a further aperture 410 in bracket 294. Pin 408 supplies a sufficient force to engage groove 406 while permitting rotation of support frame 404 as by means of an attached handle 412. Alternately if more accurate positioning of frame 404 is desired, a micrometer arrangement may be substituted for handle 412 as may be understood by one skilled in the art.

Connected to supporting frame 404 as by means of a number of screws 414 is a laminated magnetically permeable yoke 416, a front elevation of which is shown in FIGURE 22. Yoke 416 includes a pair of pole portions 418 and 420 which partially encircle rotating shaft end 286. Located between poles 418 and 420 is a permanent magnet 422 fixedly attached to shaft portion 286. Poles 418 and 420 are connected by an extended portion 424 of yoke 416 around which is wound a field coil 426. Magnet 422 is so shaped that the flux patterns through core 424 are substantially sinusoidal as shaft 254 rotates. Thus, the current generated in field coal 426 is substantially sinusoidal also. The output of field coil 426 is connected to the horizontal deflection circuit of cathode ray device 188 to cause one sweep per rotation of shaft 254, as further amplified below.

From a consideration of the crystal diagrams of FIGURES 4, 9, and 10, it may be seen that if the crystal specimen is rotated about its face normal 58 as by means of the above-described apparatus, the atomic plane normal 46, the incoming X-ray 52, and the reflected beam 54 (if it exists), will generally not lie in a plane including face normal 58. This is, of course, true whether atomic plane 44 is oriented in the simple manner shown in FIGURES 4 and 9, or in the more complex manner shown in FIGURE 10. This fact is exploited to great advantage in the present invention, since it has been discovered that visual inspection of the X-ray reflection patterns caused by (1) continuous rotation of the crystal specimen about the face normal and (2) variation of the angle between the face normal and the incident beam yields a uniquely identifiable pattern when the incident and reflected beams are mutually coplanar with face normal 58.

More specifically, with reference to FIGURE 23, there is shown a representation of certain physical characteristics of a crystal specimen, such as those shown in FIGURES 4, 9, and 10. The orientation of a particular atomic plane (not shown for purposes of clarity) is characterized by an angle $\phi$ between a line 428, normal to the plane and a line 430 normal to the face of the crystal (also not shown).

For purposes of discussion, a $C_1$, $C_2$, $C_3$ system, may be thought of as fixed with respect to the crystal holder apparatus 134 shown in FIGURE 11. The $C_1$ axis is the vertical positioning axis about which turntable 130 (see FIGURE 12) is rotated under control of friction drive assembly 160. The $C_2$ axis is the axis of rotation of vacuum chuck 136, the negative extension of which coincides with face normal 430 (see FIGURE 15), while the $C_3$ axis is mutually perpendicular to the $C_1$ and $C_2$ axes in a right-handed coordinate system.

An X-ray beam is shown incident along a line 432 in the $C_2$–$C_3$ plane at an angle $g$ relative to the $C_2$ axis, while a reflected beam 434 is shown in a space at an angle 180—2B from the extension 436 of incident X-ray beam 432. As in the case of FIGURE 4, the necessary condition for X-ray reflection is that atomic normal 428 be disposed at certain specific angles (e.g. $B=B_1$), relative to the incoming X-ray beam 432.

At the particular instant depicted in FIGURE 23, the crystal specimen is disposed with the atomic normal 428 at an angle $\theta$ relative to a line 438 parallel to the $C_3$ axis. As previously noted, the incident and reflected X-rays are mutually coplanar with atomic normal 428 in a plane denoted 440 in FIGURE 23.

Assume now that the crystal is being continuously rotated about the $C_2$ axis, and that the $C_2$ axis exactly coincides with the crystal face normal 430. Under such conditions, the atomic normal 428 will rotate and, assuming that the angle $g$ is held fixed, the angle B between incident beam 432 and the atomic normal will vary. If the angle $g$ is so chosen that for some angle $\theta$ the angle B equals $B_1$, then an X-ray beam will be reflected along line 434 as shown. As may be understood, by adjusting the position of arm 138 in FIGURE 11, variation in $g$ will cause corresponding variation in the value of $\theta$ for which B equals $B_1$.

Now, with reference to FIGURE 24, there is shown the condition in which $\theta$ equals 0°. If an angle $g$ equals $g_0$ is chosen such that B equals $B_1$, a reflected beam will be present along line 442. Moreover, for the condition shown in FIGURE 24, the atomic normal 428 is situated in the $C_2$–$C_3$ plane, therefore, the reflected X-ray 442 will also be located in the $C_2$–$C_3$ plane. This greatly simplifies the placement of the X-ray detector, since the general case shown in FIGURE 24 may be treated in the same manner as described in connection with FIGURES 5 through 8; namely, the source and the detector may both be located in the $C_2$–$C_3$ plane separated by the angle 180—$2B_1$. With the apparatus of FIGURE 11, this would be accomplished by the adjustment of the position of detector 110 in slot 125 and the insertion of positioning pin 129 through aperture 123 (see FIGURE 13) and the appropriate one of apertures 128. Then, the value of $g=g_0$ would be determined by a reading of dial indicator 146 when a reflection occurs.

While the incident and reflected X-rays 432 and 442 have been depicted in FIGURES 23 and 24 as narrow lines, it may be understood that the beams may be of substantial width and height. Thus, even if a detector with an extremely small field of view is disposed along line 442 in FIGURE 24, it would not appear to be possible to determine accurately the value of $g_0$ since reflections for values of $\theta$, slightly different from 0°, will cause reflections close to $C_2$–$C_3$ plane, which reflections will be sensed by the detector.

Fortunately, however, it has been discovered that there exists an advantageous relationship between the angle $g$ and the angle $\theta$ at which reflections can occur, whereby, measurements can be made with sufficient precision to meet even the most demanding tolerance requirements.

In particular, it has been found that for $g$ and $\phi$ defined as in FIGURES 23 and 24, and for a value $B=B_1$, the angle $\theta$ at which a reflection occurs is given by:

$$\frac{\cos\theta = \cos\phi\,\cos g = \cos B_1}{\sin\phi\,\sin g} \qquad (1)$$

This relationship is represented by a curve such as shown in FIGURE 25. From the figure, it may be seen that within the limits $g_{min}\leq g\leq g_{max}$. (beyond which Equation 1 is not defined), each value of $g$ will satisfy Equation 1 for two values of $\theta$, except at the limit $g=g_{max.}$, where Equation 1 is satisfied only by a single value of $\theta$.

In other words if the crystal of FIGURES 23 and 24 is rotated about its face normal 430, i.e., about the $C_2$ axis, and the angle $g$ between the incoming beam 432 and the face normal is varied, the value of $g$ for which only one reflection occurs per rotation of the crystal corresponds to the angle $g=g_{max}$.

As previously explained, the horizontal deflection circuit of cathode ray tube 188 (see FIGURE 11) is driven by the rotating generator 192, while the vertical deflection circuit is driven by the output of X-ray detector 110. The display traces which result from variation of the angle $g$ are depicted in FIGURES 26a through 26d. In FIGURE 26a, is shown the trace when the angle between the incident beam and the face normal exceeds the limits within which (1) is defined. The horizontal display axis is continuously swept by the rotation of generator 192; however, since there are no values of $\theta$ at which reflections can occur, only the base line 444 is visible.

On the other hand, within the range $g$ min$<g<g_{max.}$, there will always be two values of $\theta$ at which the angle between the incident beam and the atomic normal satisfies the requirement $B=B_1$. Therefore, for each sweep of the horizontal deflection circuit, two vertical deflections (446 and 448 in FIGURE 26b and 446' and 448' in FIGURE 26c) appear on the cathode ray tube face. The trace represented in FIGURE 26b corresponds to a value of $g$ which differs moderately, e.g. approximately 1° or more from the upper limit $g=g_{max.}$. As the angle $g$ is adjusted to approach $g_{max.}$ the two peaks begin to merge as shown in FIGURE 26c until, at $g=g_{max.}$, the two peaks merge into a single peak 450. In practice, it is found that the measurement of $g=g_{max.}$ is extremely accurate since even slight variations will cause two reflections per rotation which condition is immediately evident from the display patterns. Moreover, as may be seen from FIGURE 25, the slope of the curve is extremely high in the vicinity of $g=g_{max.}$ whereby even slight variations in the value of $g$ will cause the display image either to disappear (as in FIGURE 26a) or to separate into two readily distinguishable peaks (such as 446′ and 448′ in FIGURE 26c).

Once the value of $g_{max.}$ has been determined, this angle may be directly employed to determine the orientation of the atomic plane relative to the crystal faces since it has been found that the value of the angle $g_{max.}$ is related to the values of the angles $a_1$ and $a_3$ by the relationship:

$$\sin(g_{max.}+B_1)=\cos a_1 \cos a_3 \qquad (2)$$

where $a_1$ and $a_3$ are the angles defined in connection with FIGURE 10.

For $a_1=0°$, the value of the angle $a_3$ may be found directly from the relationship:

$$a_3=g_{max.}-90+B \qquad (3)$$

or by appropriate calibration of dial indicator 146 shown in FIGURES 11 and 12. Similarly, if the angle $a_1$ is not equal to the 0° but is nonetheless known, the determination of the angle $a_3$ still follows directly from the relationship found in Equation 2.

Moreover, even in many instances when the value of the angle $a_1$ is not known, Equation 2 may be used directly to determine the value of the angle $a_3$ on the assumption that the angle $a_1$ is approximately equal to 0°. It has been found that for $a_1=0°\pm10'$, no significant error is introduced by this assumption.

Where it cannot be assumed that $a_1$ is approximately equal to 0°, the above described techniques are readily employed by the choice of some value of $g$ less than $g_{max.}$, and by the measurement of the angles $\theta$ at which reflections occur.

In order to best describe the manner in which the techniques and apparatus of the present invention are used, let it be assumed that there is to be produced a round crystal having a particular atomic plane intersecting the crystal faces with the angle $a_1$ defined above equal to zero. Such a crystal is shown in FIGURE 9. As previously noted, following an optical analysis of the mother crystal and the location of the crystallographic axes therein, the crystal is cut into a rectangular blank such as shown in FIGURE 2 or into a disc shaped blank such as shown in FIGURE 9. In either case, the crystal faces are disposed at the desired angles relative to the crystallographic axis in order to select the desired temperature-frequency characteristics. In many instances, it is not only practical, but also desirable that the crystal be so cut that one face of the blank such as 36 shown in FIGURE 2, is parallel or includes the X axis. Thus, at least one atomic plane (e.g. plane 44 in FIGURE 4 or plane 44′ in FIGURE 9) will intersect the crystal faces with angle $a_1$ equal to zero. The crystal may be made round without regard to lack of the reference edge since subsequent X-ray analysis is independent of such an edge according to this invention.

After the crystal has been cut, it is lapped in accordance with conventional techniques for an initial period of time to reduce the crystal blank thickness by a certain amount. After such preliminary lapping, the crystal specimen is mounted on vacuum chuck 136 with one of its faces against sapphire beads 334 (see FIGURE 18) and vacuum pump 300 is operated, whereby the crystal specimen is firmly held thereagainst, with its face-normal 58 (shown in FIGURE 4) parallel to the longitudinal axis of the vacuum chuck. Motor 380 is operated and an X-ray beam permitted to impinge upon the rotating specimen. The pattern on display 188, or the reading of meter 186 is viewed to determine whether the angle $g$ is within the limits $g$ min $<g=g_{max.}$, which is immediately evident from a positive reading on meter 186 or the presence of one or more pulses on the display face. If necessary, knob 162 is rotated to reposition turntable arm 138 so that the angle $g$ falls within the desired limits.

Lead screw 222 is then rotated by adjusting knob 224 so that the entire crystal holder assembly 134 travels parallel to the crystal face normal between sloping edges 204 and 206 of gibs 208 and 210, respectively. Knob 224 is adjusted until the reading obtained on meter 186 is maximum. This serves to compensate for varying crystal thickness and may be desirable in order to maximize the intensity of the reflected X-ray. After the crystal holder assembly 134 has been properly positioned screws 212 (FIGURE 16) are tightened to prevent further movement. The rotational axes of shaft 254, and vacuum chuck 136 must then be accurately aligned. This is most conveniently done by noting initial readings on meter 186, (while the crystal is rotating), and then comparing such initial readings with further readings obtained for different orientations of the specimen relative to the rotational axes. To facilitate the above rotation, there may be placed four reference marks on front tubular member 310 of vacuum chuck 136 (such as 454 in FIGURES 16 and 17) located at 90 degrees relative to each other around the circumference thereof. A pencil mark on the specimen is aligned with a first mark, motor 380 started, and the meter reading noted. The crystal is then held fixed, e.g., by the fingers, and the vacuum chuck rotated relative to it until a second reference mark 454 located 180° from the first mark is aligned with the pencil mark on the specimen. The crystal is again set in rotation by motor 380 and the meter reading taken. Adjusting screws 352 and 353 are then tightened or loosened until the meter reading at the second position is equal to that at the first position.

The crystal is then rotated relative to the vacuum chuck 136 a further 90 degrees. Motor 380 is again operated and the meter reading for this orientation taken. Then the crystal is rotated 180 degrees relative to the third mark, and a meter reading taken at this position and compared with that taken for the third position. Screws 352 and 353 are again adjusted until the meter readings at the third and fourth positions are equal. Then as a final check, the crystal is rotated in steps of 90 degrees and the meter readings compared, to assure that all four readings are equal. If such is not the case, suitable additional adjustments of set screws 352 and 353 are made until exact coincidence of all four meter readings occurs. This procedure is found to result in a highly accurate alignment of the rotational axes of shaft 254 and the crystal face normal 58.

The apparatus is then used to obtain an extremely accurate measurement of the angle $g_{max.}$. The crystal is again set in rotation, and knob 162 adjusted until the display pattern corresponds to that shown in FIGURE 26d. As will be understood, since there are basically only three possible display patterns, the operator may rapidly adjust the position of turntable 130 to achieve the desired pattern. The reading on dial indicator 146 is then taken in order to obtain the value of $g_{max.}$.

As previously mentioned, dial indicator 146 is calibrated to read the value of the angle $a_3$ directly if the angle $a_1$ lies between $\pm 10'$, as is most often the case, when the blank is originally cut along the X axis, and an angle $B_1$ corresponding to an atomic plane parallel to such axis is chosen.

For other values, Equation 2 above may be applied in a straightforward manner, as will be obvious to one skilled in the art in light of the above discussion.

Thus, a rapid and accurate determination can be made as to whether the partially completed crystal is within the required tolerance limits. As long as such limits are not exceeded, the subsequent manufacturing steps e.g., further lapping, polishing, attachment of leads, etc., may proceed with reasonable assurance that the ultimately completed crystal will not have to be discarded due to improper orientation.

If analysis as described above reveals a substantial departure of the crystal orientation from that desired, angle correction apparatus of conventional construction may be employed to remove material from the crystal faces in order to modify the orientation thereof relative to the atomic plane. The crystal blank may then proceed again through the various lapping stages, if necessary, to provide accurate adjustment of crystal thickness.

Of course, as may be understood, the above process of measurement and angle correction may be repeated as many times as necessary in order to provide the desired crystal orientation, as long as the crystal thickness is not reduced to such a great degree that the resonant frequency thereof is no longer within the desired range.

If it is desired to employ the above described apparatus to measure the flatness of a crystal specimen, the crystal is attached to vacuum chuck 136 as previously described; motor 380 is operated and the apparatus adjusted to bring the angle $g$ within the limits $g_{min.} \leq g \leq g_{max.}$ The display pattern is noted for such initial location after which the crystal is moved from its original position to a series of other positions, and the corresponding display patterns compared with the original pattern. For example, in the case of a square specimen it may just be centered on the axis of rotation and moved so that the axis of rotation is successively located at each of the four corners. Similarly, in the case of a round crystal, the crystal may be initially centered on the axis of rotation followed by rotation about successive positions along the circumference. As will be understood, if the crystal surface bearing against vacuum chuck 136 is not flat, the normals to that face will not coincide with the axis of rotation at all points on the surface. Therefore, for a given setting of turntable 130, the actual value of the angle $g$ may vary in accordance with the placement of the crystal on the vacuum chuck, causing a corresponding variation in the value of $\theta$ at which reflections will occur, in accordance with Equation 1 above. Such variation will immediately be evident by the changing display pattern.

For example, at one location on vacuum chuck 136, the crystal may produce a display pattern having a single peak per rotation, i.e., $g$ substantially equal to $g_{max.}$. If the crystal is not flat, movement of the crystal on the vacuum chuck may cause the display trace to separate into two peaks, as in FIGURES 26b and 26c, or to disappear completely, as in FIGURE 26a. Since increasing separation of the peaks corresponds to decreasing values of $g$, and decreasing separation or even disappearance of the peaks corresponds to increasing values of $g$, it may readily be seen that a qualitative indication of changes in crystal surface flatness may be obtained simply by noting variations in the display pattern.

Of course, in order to obtain an indication of flatness of the opposite surface of the crystal, i.e., the surface initially irradiated, the crystal is merely inverted so that the originally irradiated surface now bears on sapphire beads 334 and vairation of the normal to that face relative to the axis of rotation determined.

Moreover, the apparatus may be so adjusted for the initial placement of the crystal specimen so that $g = g_{max.}$ for that location, and quantitative indications of the flatness of the crystal face obtained by successively adjusting the angle $g$ as the crystal is reloacted relative the axis of rotation so that the display trace continues to display exactly one peak per rotation of the specimen. The variations in the required angle of $g$ give an extremely accurate record of the changes in the orientation of the crystal face normal across the surface of the specimen.

Thus, there have been described techniques and apparatus in accordance therewith by which the extremely serious and longstanding problems facing the manufacturers of piezo-electric crystals have been overcome. The invention provides an extremely rapid and accurate technique for determining the orientation of atomic planes relative to the crystal faces whereby the exacting tolerance requirements necessary for modern compensated circuit techniques may be met in an economical and commercially satisfactory manner.

Moreover, the invention described above, provides a novel and improved techniques for determining the flatness of crystal faces, without the necessity of first polishing such faces to make them light reflective.

As will be understood, considerable variation in the above described techniques and construction are contemplated within the scope of the invention.

For example, modification in the construction of the machine itself within the limits set forth above are obviously within the scope of the invention. In addition, it will be recognized that the above described techniques need not proceed in the exact manner described, but are subject to such variation as will be appropriate in the particular case.

Also, it will be recognized that while the invention has been described in terms of the manufacture of piezoelectric crystals for ultra-stable oscillators, the techniques described are also readily adaptable to the X-ray analysis of any structure where it is desired to determine the orientation of a crystal lattice thereof relative to the external dimensions of the crystal.

Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for X-ray analysis of crystalline substances comprising: means for generating an X-ray beam; an X-ray detector; means for positioning the X-ray detector at a desired angle relative to the X-ray beam; a mounting fixture for supporting a crystalline specimen to be analyzed, so located with respect to the X-ray beam that X-rays reflected from said specimen will be directed toward said X-ray detector; said mounting fixture including means for continuously rotating said crystalline specimen about an axis normal to one surface thereof; positioning means to select the angle between the incident X-ray beam and the axis of rotation, independent of said rotation; and means to measure the last-named angle.

2. The apparatus as set forth in claim 1, further including means connected to the X-ray detector for providing a visual indication of the reflected X-rays as a function of the rotation of the crystal specimen.

3. The apparatus as set forth in claim 2, where the last named means includes a cathode ray device having a first deflection circuit connected to the X-ray detector output, and further deflection means to generate a periodic time base in synchronism with the rotation of the crystal specimen.

4. The apparatus as set forth in claim 1, where the X-ray source includes means for continuously exciting an X-ray beam by the impingement on a metal target of a stream of electrons subject to a substantially constant accelerating force.

5. Apparatus as set forth in claim 1 where said means for continuously rotating the crystalline specimen includes a rotatable shaft, a crystal holder attached to said shaft for mounting said specimen with at least one surface thereof substantially normal to the axis of rotation, said holder including means to vary the angular disposition of the longitudinal axis thereof relative to the axis of rotation, whereby to assure said normal relationship between said one crystal surface and said axis of rotation; and driving means for continuously rotating said shaft and said crystal holder.

6. The apparatus as set forth in claim 5, where the driving means is adapted to rotate the shaft at a speed of at least approximately 1,000 r.p.m. but less than approximately 2,500 r.p.m.

7. The apparatus as set forth in claim 6, where the shaft is rotated at a speed of approximately 1,200 r.p.m.

8. The apparatus as set forth in claim 5, where the driving means comprises a motor, and coupling means for rotating the shaft while applying substantially no effective transverse force thereto.

9. The apparatus as set forth in claim 1, where the X-ray detector is of the scintillation-counter type.

10. The apparatus as set forth in claim 1, where the X-ray detector includes a crystal for producing optical energy in response to the impingement of X-rays thereon, and photo-multiplier means for transforming the optical energy into a measurable electrical signal.

11. Apparatus as set forth in claim 10 further including a cathode ray display device having a first deflection circuit connected to the output of said photomultiplier means; a signal generator on said mounting fixture for generating a periodic signal at the frequency of crystal rotation; and a second deflection circuit for said cathode ray device coupled to said signal generator for establishing a periodic time base for said display having a period equal to the period of rotation of the crystal specimen.

12. Apparatus as set forth in claim 1 wherein said incident X-ray beam and said axis of rotation define a plane and wherein said positioning means includes means for varying the orientation of said mounting fixture about a line normal to the axis of rotation to adjust the angle in said plane between the axis of crystal rotation and said incident X-ray beam.

13. Apparatus for X-ray analysis of crystalline substances comprising: an X-ray source for generating a substantially constant intensity X-ray beam along a predetermined path; an X-ray detector for generating electrical signals in response to the impingement of an X-ray thereon; said source and said detector being adjustable relative to each other to establish a desired angular relationship therebetween; a specimen holder including a rotatable vacuum chuck for supporting a crystalline specimen to be analyzed, the axis of rotation of said chuck being substantially coincident with a line normal to a surface of said specimen; pivotal mounting means for said vacuum chuck to permit adjustment of the axis of rotation relative to the incident X-ray beam; a drive mechanism coupled to said vacuum chuck for effecting continuous rotation thereof about said axis of rotation; said drive mechanism comprising a rotating shaft, and a motor coupled to said shaft; said vacuum chuck being attached to said rotating shaft by a flexible diaphragm extending radially outward from the body of said vacuum chuck, said diaphragm being firmly supported at its periphery on one end of said rotating shaft.

14. The apparatus of claim 13 where the vacuum chuck supporting end of the shaft includes a cavity for receiving a portion of the vacuum chuck, and where the diaphragm is supported by a collar adapted to fit over the end of the shaft and having an inwardly bent lip for engaging with the periphery of the diaphragm.

15. The apparatus as set forth in claim 14 including adjusting means extending into the cavity and adapted radially to displace the body of the vacuum chuck, the flexible diaphragm biasing the vacuum chuck to a rest position, and providing a pivot and resilient support against which the chuck may be displaced to accurately align the axis of rotation and the line normal to the face of the crystal.

16. The apparatus of claim 13 where the motor rotates the shaft at a speed of at least approximately 1000 r.p.m. but less than approximately 2500 r.p.m.

17. The apparatus of claim 16 where the motor rotates the shaft at a speed of approximately 1200 r.p.m.

18. Apparatus for X-ray analysis of crystalline substances comprising: an X-ray source for generating a substantially constant intensity X-ray beam along a predetermined path; an X-ray detector for generating electrical signals in response to the impingement of X-rays thereon; the source and the detector being adjustable relative to each other to establish a desired angular relationship therebetween; a specimen holder including a rotatable vacuum chuck for supporting a crystalline specimen to be analyzed, the axis of rotation of said chuck being substantially coincident with a line normal to a surface of said crystalline specimen, said axis of rotation being disposed in a plane defined by said X-ray source and said X-ray detector; pivotal mounting means for said vacuum chuck to permit adjustment of the angle between said axis of rotation and said incident X-ray beam in said plane, a drive mechanism coupled to said vacuum chuck for effecting continuous rotation thereof about said axis of rotation; optical display means for generating a visual representation of the electrical output of said X-ray detector; and means to generate a periodic time base for said display means, the time base having a period equal to the period of rotation of said crystalline specimen.

19. The apparatus as set forth in claim 18 including adjusting means to align the axis of rotation of the vacuum chuck and the line normal to the crystal face.

20. The apparatus as set forth in claim 18 where the X-ray detector includes means for generating an optical output in response to the incidence of an X-ray thereon, and photomultiplier means responsive to the optical output to generate an electrical signal for the display means, and where the period of rotation corresponds to a rotational speed of at least approximately 1000 r.p.m. but less than approximately 2500 r.p.m.

21. The apparatus of claim 20 where the period of rotation corresponds to a rotational speed of approximately 1200 r.p.m.

22. Apparatus as set forth in claim 18, further including support means carrying said X-ray source and said X-ray detector; said specimen holder further comprising a housing mounted on said support means; a shaft carried by said housing and rotatable relative thereto; said vacuum chuck being attached at one end of said shaft; a passage extending through said shaft communicating with said vacuum chuck; a vacuum chamber mounted on said housing and communicating with the other end of the passage through said shaft; means coupling said drive mechanism to said shaft; said pivotal mounting means comprising means connecting said housing to said support means for varying the orientation of the housing to permit said adjustment of said axis of rotation relative to the incident X-ray beam and further including a vacuum pump attached to said vacuum chamber; said crystalline specimen being held on said vacuum chuck by the pressure differential created by said pump.

23. The apparatus as set forth in claim 22, wherein the vacuum chuck comprises an elongated structure including a crystal-supporting surface having a plurality of openings therein, and a further passage connecting the openings with the passage in the rotating shaft.

24. A specimen-holding fixture for use in X-ray location of atomic planes in crystals comprising: a housing; a rotatable shaft carried by said housing; a vacuum chamber on said housing, a vacuum chuck attached to one end of said rotatable shaft; said shaft including a passage therethrough communicating with said vacuum chuck and said vacuum chamber; means for coupling a vacuum pump to said vacuum chamber; drive means for continuously rotating said shaft relative to said housing; and mounting means for securing said vacuum chuck to said shaft, including a flexible diaphragm extending radially outward from the body of said vacuum chuck, and a generally cylindrical collar secured to the end of said shaft, said collar having an inwardly-bent circumferential lip for engaging with one surface of said diaphragm, thereby maintaining said diaphragm firmly supported at its periphery on the end of said shaft.

25. Apparatus as set forth in claim 24 wherein a portion of said vacuum chuck is disposed within the end of said passage; and including adjusting means extending into said passage adapted to engage the portion of the vacuum chuck therein, and operative to effect radial displacement of said vacuum chuck relative to the axis of rotation of said shaft; said flexible diaphragm biasing said vacuum chuck to a rest position and providing a pivot and resilient support against which said chuck may be displaced to align the axis of rotation of said shaft and the longitudinal axis of said vacuum chuck.

26. Apparatus as set forth in claim 24 including a base; track means mounted on said base for slidably supporting said housing; and means to adjust the position of said housing along said track means.

27. The apparatus as set forth in claim 25 where the vacuum chuck includes a portion normal to the longitudinal axis having a plurality of apertures for admitting air under the influence of the vacuum pump, and adapted to receive thereagainst one surface of the crystal specimen.

28. The apparatus as set forth in claim 26 where the adjusting means comprises a lead screw mounted on the base and adapted to engage a threaded follower portion of the housing, and means to firmly lock the housing in place relative to the track.

29. The apparatus as set forth in claim 24 wherein the driving mechanism comprises a motor, and means coupling the motor to the rotatable shaft to provide torque without transmitting any effective transverse force to the shaft.

30. The apparatus as set forth in claim 29 where the coupling means comprises a pulley rotatably mounted on the housing and means rigidly coupled to the pulley and to the rotating shaft and further including a pulley belt connecting the pulley to the motor.

31. The apparatus as set forth in claim 24 further including means to generate an electrical signal in synchronism with the rotation of the shaft.

32. The apparatus as set forth in claim 31 where the last named means comprises a magnet attached to the rotating shaft, a field structure attached to the housing and adapted to intercept the field of the magnet as it rotates with the shaft, and a field winding on the field structure for generating a periodic electrical signal having a period equal to the period of rotation of the shaft.

33. The apparatus as set forth in claim 32 including means for varying the angular disposition of the field structure relative to the rotating magnet.

34. Apparatus for X-ray location of atomic planes in crystalline substances characterized by the property that X-rays incident thereon at an angle $B_1$ relative to a line normal to a given atomic plane are reflected at an angle $180 - 2B_1$ from the incident beam comprising: adjustable mounting means for positioning a crystal specimen in an X-ray beam so that a line representing the direction of the incident X-ray beam defines an angle $g$ with a line normal to at least one face of the crystal; means for rotating said crystal through a continuously varying angle $\theta$ about said line normal to said crystal face independent of said angle $g$; detector means for generating an electrical signal in response to X-ray reflections from said atomic planes of said crystal along a line substantially coplanar with the lines defining said angle $g$; means to select values of said angle $g$ while said crystal is continuously rotated through said angle $\theta$, independent of said rotation to produce X-ray reflections from said atomic planes, said reflections being produced at angles $\theta$ defined by the relationship:

$$\cos \phi = \frac{\cos g \cos \phi - \cos B_1}{\sin \phi \sin g}$$

where $\phi$ denotes the angle between the normal to the atomic plane and the axis of crystal rotation; and means for visually identifying the maximum value of the angle $g$ for which the angle $\theta$ is defined by the above relationship.

35. Apparatus as set forth in claim 34 including indicator means for reading the selected values of said angle $g$, said indicator means being calibrated in terms of an angle $a_3$ in accordance with the relationship:

$$a_3 = g + B_1 - 90°$$

36. The apparatus as set forth in claim 34 where the means for visually identifying the maximum value of the angle $g$ for which the angle $\theta$ is defined comprises a cathode ray device including vertical deflection circuitry and horizontal deflection circuitry, means for connecting the output of the X-ray detector to the vertical deflection circuitry, and means coupled to the crystal rotating means to generate a time base having a period equal to the period of crystal rotation, and means connecting the time base to the horizontal deflection circuitry of the cathode ray device.

37. In the X-ray analysis of crystalline substances, a method of determining the flatness of a crystal specimen face which comprises continuously rotating the specimen through an angle $\theta$ about an axis normal to at least a portion of the given face; bombarding the opposite face with a beam of X-ray energy, detecting X-ray reflections, if any, in accordance with the relationship:

$$\cos \theta = \frac{\cos g \cos \phi - \cos B_1}{\sin \phi \sin g}$$

where $g$ equals the angle between the X-ray beam and the axis of rotation, $B_1$ equals the angle between the axis of rotation and a line normal to an atomic plane in the crystal, and $\theta$ equals the angle of rotation at which reflections occur; visually displaying a signal representative of detected X-ray reflection as a function of the rotation of said crystal specimen; selecting a succession of axes of rotation, each axis being normal to a portion of the surface of said crystal specimen; and comparing the visual display for each such axis of rotation; variations in the display patterns being representative of local variations in the flatness of the surface of said crystal specimen.

38. In the X-ray analysis of crystalline substances, the method of determining the orientation of an atomic plane relative to a given external surface of the crystal specimen which comprises: continuously rotating the specimen about an axis normal to the given face, bombarding the given face with a beam of X-ray energy, varying the angle $g$ between the incident beam and the axis normal to the given face, determining the existence of a reflection of the incident X-ray beam at each angle $g$ and determining the maximum value of the angle $g$, $g$ max, at which reflected X-rays are found to exist.

39. The method as set forth in claim 38 where the atomic plane intersects at least one face of the crystal specimen along a line normal to the plane defined by the incident X-ray beam and the axis of rotation, further including the step of calibrating an indicator to read the angle $a_3$ between the atomic plane and the given face in accordance with the relationship:

$$a_3 = g_{\max.} - 90° + B_1$$

where $180° - 2B_1 =$ the angle between the incident and reflected beams.

40. The method as set forth in claim 38 where the atomic plane intersects at least one face of the crystal along a line at an angle $a_1$ relative to a line normal to the plane defined by the incident X-ray beam and the axis of rotation, further including the step of determining the value of the angle $a_3$ between the atomic plane and the given face in accordance with the relationship:

$$\cos a_1 \cos a_3 = \sin (g_{\max.} + B_1)$$

where $180 - 2B_1 =$ the angle between the incident and reflected beams.

41. The method as set forth in claim 38 where the atomic plane intersects at least one face of the crystal in a line at an angle within the limits 0°±10′ relative to a line normal to the plane defined by the incident X-ray beam and the axis of rotation, further including calibrating an indicator to read the angle $a_3$ between the atomic plane and a given face in accordance with the relationship:

$$a_3 = g_{max.} + B_1 - 90°$$

where $180° - 2B_1$ = the angle between the incident and reflected beams.

42. The method as set forth in claim 38 where the beam of X-ray energy is of substantially continuous intensity.

43. The method as set forth in claim 38 where the crystal specimen is rotated at a speed of at least approximately 1000 r.p.m. but less than approximately 2500 r.p.m.

44. The method as set forth in claim 43 where the crystal is rotated at a speed of approximately 1200 r.p.m.

45. The method as set forth in claim 38 where the step of detecting the maximum value of the angle $g$ at which a reflection can occur comprises positioning an X-ray detector at a fixed angle relative to the X-ray beam, connecting the output of the X-ray detector as the information input to a visual display device, generating a time base for the visual display device in synchronism with the speed of rotation of the crystal specimen, and varying the angle $g$ until only one peak per rotation of the specimen is present on the visual display device.

46. The method as set forth in claim 45 wherein said X-ray detector is positioned in coplanar relationship with a line defining the direction of the incident X-ray beam and with the axis of rotation of said crystal specimen.

47. The method as set forth in claim 38 further including the step of aligning the axis of rotation of the crystal specimen with a line normal to one of the crystal faces.

48. The method as set forth in claim 47 where the last named step comprises adjusting the orientation of the normal relative to the axis of rotation until the reflected X-ray intensity produced when the crystal is rotating at a fixed angle $g$, is substantially independent of rotation of the normal with respect to the axis of rotation.

References Cited

UNITED STATES PATENTS

| | | | |
|---|---|---|---|
| 2,805,340 | 9/1957 | Lewis | 250—51.5 |
| 3,178,573 | 4/1965 | Woolley | 250—51.5 |
| 3,189,741 | 6/1965 | Patser | 250—51.5 |
| 3,277,302 | 10/1966 | Weighart | 250—51.5 |
| 3,368,675 | 2/1968 | Aiken et al. | 250—51.5 X |

RALPH G. NILSON, *Primary Examiner.*

A. L. BIRCH, *Assistant Examiner.*

U.S. Cl. X.R.

29—25.35